United States Patent [19]

Gryczka

[11] 4,013,797
[45] Mar. 22, 1977

[54] BACTERIAL COMPOSITIONS AND PROCESS FOR FERMENTATION OF MEAT THEREWITH

[75] Inventor: Alfred J. Gryczka, Sarasota, Fla.

[73] Assignee: Microlife Technics, Inc., Sarasota, Fla.

[22] Filed: Dec. 10, 1975

[21] Appl. No.: 639,473

[52] U.S. Cl. .................................. 426/56; 426/59; 426/61

[51] Int. Cl.$^2$ .......................................... A23L 1/31

[58] Field of Search ................ 426/56, 59, 61, 266

[56] References Cited

UNITED STATES PATENTS

| | | | |
|---|---|---|---|
| 3,193,391 | 7/1965 | Jansen et al. | 426/56 |
| 3,561,977 | 2/1971 | Rothchild et al. | 426/59 |
| 3,794,739 | 2/1974 | Lee et al. | 426/56 |
| 3,814,817 | 6/1974 | Everson et al. | 426/56 |

FOREIGN PATENTS OR APPLICATIONS 1,692,174  3/1972  Germany

OTHER PUBLICATIONS

Nunivaara, et al., "Bacterial Pure Cultures in the Manufacture of Fermented Sausages," Food Technology, vol. 18, No. 2, 1964, pp. 25–31.

*Primary Examiner*—A. Louis Monacell
*Assistant Examiner*—C. A. Fan
*Attorney, Agent, or Firm*—Ian C. McLeod

[57] ABSTRACT

An improved process for producing a red color in meat, particularly sausage, using *Micrococcus species* NRRL-B-8048 alone or preferably in admixture with *Lactobacillus plantarum* and/or *Pediococcus cerevisiae* or with other lactic acid producing bacteria is described. *Micrococcus sp.* NRRL-B-8048 rapidly (in about 4 hours or less) develops the solid bright red color associated with sausage and other fermented and non-fermented meats in the presence of edible nitrate or in the presence of relatively small amounts of added edible nitrite sufficient to more rapidly generate a red color because of NRRL-B-8048. Combinations of the nitrite and nitrate can be used. NRRL-B-8048 can be used to produce processed meats with a red color with a very limited fermentation time (hours) or to produce sausage with a longer fermentation time (days). *Micrococcus sp.* NRRL-B-8048 is preferably provided in the form of a cell concentrate which is frozen for storage and subsequent thawing for use.

19 Claims, No Drawings

BACTERIAL COMPOSITIONS AND PROCESS FOR FERMENTATION OF MEAT THEREWITH

SUMMARY OF INVENTION

This invention relates to the process for developing a red color in meat products, including dry or semi-dry sausages and meat products which are not usually fermented such as processed meats, using *Micrococcus species* NRRL-B-8048 which rapidly develops a uniform solid bright red color in the meat in the presence of edible nitrate or with relatively small amounts of edible nitrite which more rapidly generate a red color because of NRRL-B-8048. It also relates to novel bacterial concentrates which produce this result.

PRIOR ART

Edible nitrite is used in sausage and processed meats to prevent the growth of *Clostridium botulinum* and related bacteria which produce very poisonous toxins. It is added to meat in the United States at levels of about 75 to 156 ppm as sodium nitrite which also produces a desirable red color in the meat. Currently nitrite levels cannot exceed 200 ppm in the final product; however, proposals are being made by the Food and Drug Administration to lower this level as discussed in Vol 40 Federal Register Page 218 (1975). Supplemental to sodium nitrite, sodium nitrate is also added to meats as a preservative although its use in non-sausage products may be limited in the United States by the FDA. It is a naturally occurring constituent in many foods. Food Technology November 1972, Vol. 26, No. 11 contains a summary regarding the use of nitrates and nitrites by the prior art.

Processes for dry and semi-dry sausage preparation are examples of conventional fermentations where red color is produced along with substantial amounts of acid. Dry and semi-dry sausages vary in taste according to the meat source, i.e., pork, beef, veal, etc., and their different mixtures, and the sugar and spices used in processing. The fairly distinct categories of semi-dry sausage are known as summer sausage, cervelat, Thuringer, pork roll, lebanon bologna, and various kinds of Italian sausage such as Pepperoni and Cappicola. Some dry sausages are Chorizos, hard salami, Genoa salami, German katenwurst and Mettwurst salamis. There are other dry and semi-dry sausages which are produced by the present invention.

Dry and semi-dry sausages are generally distinguished from other types of sausages by the prior art in that they are fermented. The comminuted meat mixture, which may or may not first be cured, is mixed with added salt, spices, edible nitrite and/or nitrate and optionally with an enediol reducing agent and acid forming chemicals or bacteria. It is then stuffed into casings and fermented with bacteria. Curing allows the edible nitrites, and nitrates upon subsequent reduction to nitrite, to form nitric oxide which in the presence of acids combines with the pigment in the meat to produce the red color associated with the sausage. It is the edible nitrites which generate the red color in the meat and which provide protection against the formation of botulism toxin.

The fermenting sausage may be given a light smoke. The semi-dry sausages are normally cooked after the fermentation without extensive drying. The dry sausage is dried for various time periods under controlled humidity and temperature conditions, depending upon the nature of the end product. Because of this processing, the resulting sausages differ from other types of sausage, such as fresh, smoked, cured, cooked and the so-called new condition sausages.

A commonly used starter bacterium for fermenting meat to produce semi-dry sausage is *Pediococcus cerevisiae* because it produces large amounts of lactic acid, which gives the final sausage its characteristic tang. This bacterium is commerically obtainable both in a frozen state as a concentrate and in a lyophilized state. It may be for instance the bacterium described in U.S. Pat. No. 3,561,977.

Other bacteria which are used are members of the *Lactobacillaceae* family of bacteria, especially those known to be good producers of lactic acid, such as *Lactobacillus plantarum*, or *Streptococcus lactis* and combinations of these bacteria. One especially effective *Lactobacillus plantarum* for dry or semi-dry sausage is strain NRRL-B-5461 because of its ability to grow at lower temperatures, as, for example, in the range of 50°–85° F (10°–30° C) and to rapidly produce lactic acid. When this particular strain is employed as a concentrate in the manufacture of dry or semi-dry sausage, a broad range of fermentation temperatures is made available. This strain allows the sausage manufacturer to produce products having a distinct and characteristic tang quickly and with good reproducibility. It also tends to reduce the growth of undesirable contaminating microorganisms. The use of NRRL-B-5461 is particularly described in U.S. Pat. No. 3,814,817.

*Micrococcus* is also used in making sausage, particularly in Germany. W. German Pat. No. 1,692,174 describes an unidentified strain of *Micrococcus* mixed with lactic acid forming bacteria, with substantial amounts of gluconic acid delta lactone (GDL) to lower the pH, and with polyphosphates, ascorbic acid and its sodium salts. The *Micrococcus* is shown to be mixed with sodium nitrite which produces the red sausage color during the fermentation as discussed above.

Fermented meat has been prepared for other purposes besides sausage. Included are for instance petfoods; however, sausage is by far the most economically important product. A red product color and inhibition of botulism bacteria is also desirable in meat products which are not conventionally obtained by any fermentation and which are referred to as "processed meats." Included in this group of products are frankfurters, bologna, luncheon meats and the like. In order to generate a red color and inhibit botulism bacteria, sodium nitrite is added to the meat mixture at levels of about 75 to 156 ppm which develops the color during processing. It would be highly desirable to be able to reduce the use of edible in preparing these products while retaining the red color since botulism bacteria inhibition occurs at about 50 ppm added nitrite.

OBJECTS

It is therefore an object of the present invention to provide a process for producing meat with a solid uniform bright red color and good flavor with the addition of edible nitrite in amounts which more rapidly produce a red color change at lower concentration levels which are less than about 75 ppm. It is also an object of this invention to provide unique bacterial concentrates for producing this red color change. It is particularly an object of the present invention to provide bacterial concentrates which produce fermented meat wherein the pH and flavor of the fermentate can be controlled by using mixtures of bacteria in various ratios. These and other objects will be increasingly apparent by reference to the following description.

GENERAL DESCRIPTION

*Micrococcus sp.* NRRL-B-8048 is used in the present invention for producing a red color in meat. It can more rapidly produce a red color change in the meat with a relatively smaller amount of edible nitrite than is conventionally used or it can very rapidly produce the red color change in the presence of edible nitrate alone. This *Micrococcus* also has relatively good acid forming properties which can be helpful in the formation of nitric oxide from the nitrite which reacts with components of the meat to form the red color.

The preferred concentrate useful for producing a red color in meat comprises at least about $1 \times 10^9$ cells per ml of *Micrococcus sp.* NRRL-B-8048 in a nutrient medium and is frozen to less than aobut $-20°$ C for storage and shipment. The invention also includes the improvement in the process for producing a red color in meat which comprises mixing with meat in the presence of an edible nitrate or an edible nitrite or mixtures thereof a composition which comprises as an active ingredient *Micrococcus species* NRRL-B-8048 so as to produce a uniform solid bright red color, wherein the nitrite if used is added in an amount (less than about 75 ppm) which more rapidly produces a color change in the presence of NRRL-B-8048.

As used herein the term "red color change" means the color associated with presently marketed fermented sausages and processed meats as accepted in the trade. It is easily distinguished from the gray color of untreated aged meat. Also edible nitrites initially produce a gray color when mixed with meat which changes to a red color over a period of time as is well known to those skilled in the art.

The process using NRRL-B-8048 alone is effective in making processed meats (frankfurters, bologna, luncheon meats and the like) where there is limited fermentation over a period of about 4 hours or less. In this event, small but insignificant amounts of acid are generated by fermentation of sugars in the meat. Thus, as used in this specification and claims, "fermentation" includes the action of NRRL-B-8048 on sugars or other organic ingredients of the meat along with the chemical change with edible nitrate and/or nitrite which is evidenced by the red color over short periods of time and change regardless of whether significant amounts of acid are generated in the meat.

*Micrococcus species* NRRL-B-8048 is available from the U.S. Department of Agriculture, 1815 North University St., Peroria, Ill. where it was deposited for me. It has never been suggested by the prior art to use NRRL-B-8048 for any purpose related to meat fermentation.

It is known that members of the genus *Micrococcus* reduce edible nitrate to a nitrite which in the presence of acidic conditions forms nitric oxide which forms the bright red color in sausage by reaction with the pigment in the meat and certain species of *Micrococcus* show this color change in meat. However, the bright red color produced with NRRL-B-8048 is much more rapidly and uniformly developed throughout the meat mixture, than with other species of the genus *Micrococus* which have been tested under the same conditions with edible nitrate or reduced amounts of edible nitrite or mixtures thereof. *Micrococcus sp.* NRRL-B-8048 in the presence of nitrate produces a uniform bright red color in the meat in 4 hours or less while the best known prior art *Micrococcus* NRRL-B-8049 used in making sausage slowly generates this red color in no less than 12 to 24 hours. In the presence of reduced levels of nitrite (less than 75 ppm), the red color is more rapidly developed in the presence of NRRL-B-8048. This result with NRRL-B-8048 does not depend upon whether lactic acid producing bacteria or added acids are used because NRRL-B-8048 develops substantial acidity itself. Thus the bright red color which is rapidly developed using NRRL-B-8048 in such meat mixtures is an unexpected result, particularly since the product produced has a desirable flavor.

Because of its rapid action NRRL-B-8048, "gray ring," a color defect which is seen in fully dried sausage, can be prevented. The defect is evidenced by a gray ring around the casing. This defect is believed to be caused by accumulations of hydrogen peroxide. NRRL-B-8048 may generate catalase enzyme faster which in turn destroys the hydrogen peroxide. In any event, this is an added advantage of the use of NRRL-B-8048.

Edible nitrites in the form of sodium nitrite have been used to prevent the growth of botulism toxin producing bacteria in meat products. *Micrococcus sp.* NRRL-B-8048 by rapidly generating nitrites from the edible nitrates can act to perform this function in place of all or a portion of the edible nitrites. As from the specific description, NRRL-B-8048 very rapidly develops a nitrite from a nitrate which can function to inhibit contaminant bacteria.

Small amounts of edible nitrites can be used for their initial antimicrobial action in making meat products according to the present invention. NRRL-B-8048 acts to more rapidly produce a red color in the presence of such small amounts of nitrite even in absence of the nitrate and amounts less than 75 ppm nitrite produce this result. Usually at least about 50 ppm nitrite is regarded as necessary to prevent the growth of botulism bacteria.

In particular, the preferred bacterial concentrate of the present invention which rapidly produces a red color in meat comprises *Micrococcus species* NRRL-B-8048 and between 0.01 and 100 parts by count of a lactic acid producing bacterium which ferments in meat per part of *Micrococcus* wherein the concentrate contains at least about $1 \times 10^9$ bacteria cells per ml and sufficient nutrient medium to enhance growth during the fermentation and is frozen to less than about $-20°$ C. The invention also includes the improvement in the method of producing of dry and semi-dry sausage and other substantially fermented meat products which comprises fermenting with meat in the presence of an edible nitrate or an edible nitrite or mixtures thereof, a composition which comprises as the active ingredients *Micrococcus sp.* NRRL-B-8048 and at least one meat fermenting lactic acid producing bacterium, so as to produce a uniform solid bright red color, wherein the nitrite if used is added in an amount (less than about 75 ppm) which more rapidly produces a color change in the presence of NRRL-B-8048.

In the concentrates of this invention, it has also been particularly found that it is advantageous in some instances to utilize lactic acid producing organisms such as *Lactobacillus plantarum, Pediococcus cerevisiae*, or *Streptococcus lactis* alone or in combination with *Micrococcus sp.* NRRL-B-8048. It has been found that the flavor of meat mixtures in the preparation of dry and semi-dry sausages is particularly improved by using *Lactobacillus plantarum* NRRL-B-5461 described in U.S. Pat. No. 3,814,817 as the source of the lactic acid producing bacterium. The use of this bacterium in preparing sausages is advantageous because it also permits the use of low fermentation temperatures in the range of 50° and 85° F (10° to 30° C), thereby minimizing the development of undesirable bacterial contaminants. The use of acid generating and regulating chemicals can also be avoided. Also, *Pediococcus cerevisiae* NRRL-B-5627, which is also freely available from the USDA, is particularly preferred since it inhibits the development of undesirable putrefying or contaminating bacteria such as *Staphylococcus aureus*.

In the preferred process, the conventional steps of making sausages are carried out. Thus, the proper selection of a single meat or different meats is chopped and mixed either separately or together. The next step is that of adding and mixing the curing agents including edible nitrates or edible nitrites (in amounts sufficient to rapidly develop a red color in the presence of NRRL-B-8048) or mixtures thereof, salt, dextrose and spices. This selection and the relative amounts conform to standard practices except that a lower level of nitrite is used (preferably 50 to 75 ppm if added alone). The bacterial concentrate is added during the mixing of the other components of the sausage.

In a preferred sausage making process of this invention, a culture composition of *Micrococcus sp.* NRRL-B-8048 in an amount between 0.01% and 1.0% and 1.0% (0.0001 to 0.001 parts) based on the weight of the meat and usually containing between about $10^8$ to $10^{15}$ cells per ml, is added to the meat mixture as soon as it is ground. Preferably the bacterial concentrate described previously containing at least about $10^9$ cells per ml is used. Sausage prepared in this manner is stuffed into casings preferably fermented at a temperature of 41° F to 125° F (5° C to 52° C) for periods of about 6 hours or more depending upon the concentration of culture used. In the preferred bacterial compositions of the present invention, the ratio of *Micrococcus sp.* NRRL-B-8048 to lactic acid bacteria by bacterial count is between 1 to 100 and 100 to 1.

The process using NRRL-B-8048 alone or in admixture with lactic acid generating organisms is particularly effective in producing semi-dry sausages. The fermentation time can be reduced somewhat over the 12 to 15 hours usually required for this process.

As indicated, *Micrococcus sp.* NRRL-B-8048 is also used to rapidly produce the desirable solid bright red color in processed meats. *Micrococcus sp.* NRRL-B-8048 is added to the specific processed meat preparation with edible nitrate or edible nitrite or mixtures thereof. The product is held at 10° to 40° C temperature for four hours or less, to allow the development of the desirable red color, and then processed in the usual manner for the particular product at elevated temperatures which kills the NRRL-B-8048.

SPECIFIC DESCRIPTION

Concentrates

*Micrococcus sp.* NRRL-B-8048 does not ferment glucose under anerobic conditions (5 days at 37° C), is coagulase negative, is not sensitive to lysostaphin and does not produce a heat stable nuclease. It is oxidase positive which is regarded as a significant identifying characteristic. It is: catalase positive; cytochrome oxidase positive; reduces nitrate; arginine dihydrolase negative; acid but no gas formed from glucose; growth in presence of 10% NaCl; and inhibited by 0.4% and 0.6% Teepol. Utilizing glucose under aerobic conditions, lactic; succinic; acetic; propionic; isovaleric and formic acids are produced. Fermentation characteristics using API Test Pack System are as shown in Table I.

TABLE I

| Substrate | Reaction |
| --- | --- |
| 1. Glycerol | + |
| 2. Erythritol | − |
| 3. d (−) arabinose | − |
| 4. L (+) arabinose | + |
| 5. Ribose | + |
| 6. d (+) xylose | + |
| 7. L (−) xylose | + |
| 8. Adonitol | − |
| 9. Methyl-xyloside | − |
| 10. Galactose | + |
| 11. d (+) glucose | + |
| 12. d (−) levulose fructose | + |
| 13. d (+) mannose | + |
| 14. L (−) sorbose | − |
| 15. Rhamnose | − |
| 16. Dulcitol | − |
| 17. Meso-inositol | − |
| 18. Mannitol | − |
| 19. Sorbitol | − |
| 20. Methyl-d-mannoside | − |
| 21. Methyl-d-glucoside | − |
| 22. N acetyl-glucosamine | + |
| 23. Amygdalin | − |
| 24. Arbutine iron citrate | + |
| 25. Aesculine iron citrate | + |
| 26. Salicin | + |
| 27. d (+) cellobiose | + |
| 28. Maltose | + |
| 29. Lactose | + |
| 30. d (+) melibiose | − |
| 31. Saccharose (sucrose) | + |
| 32. d (+) trehalose | + |
| 33. Inuline | − |
| 34. d (+) melezitose | − |
| 35. d (+) raffinose | − |
| 36. Destrine | − |
| 37. Amylose | − |
| 38. Starch | − |
| 39. Glycogen | − |

Culture concentrates of *Micrococcus sp.* NRRL-B-8048 were prepared as follows:

1. A culture medium consisting of 3% (by weight) dextrose, 2% yeast extract and 0.5% N-Z Amine Type B (Sheffield Chemical) was prepared in a 14 liter fermenter. The medium was heated to 250° F (121.1° C) and held at that temperature for 15 minutes. The medium was cooled to 90° F (32.2° C) and was inoculated with 0.75% (by volume) of an 18 to 20 hour broth mother *Micrococcus sp.* NRRL-B-8048 culture which had been incubated at 90° F (32.2° C).

2. The culture was incubated at 90° F (32.2° C) for 18 hours while the medium was constantly neutralized between pH 5.8 − 6.5 with anhydrous ammonia gas. It was necessary to constantly neutralize the acid produced by the *Micrococcus sp.* NRRL-B-8048 during culturing in order to obtain optimal yields of *Micrococcus sp.* NRRL-B-8048.

3. The bacteria were separated from the culture medium and concentrated by passing the medium containing the bacteria through a continuous flow automatic centrifuge which discharged the liquid medium and collected the bacteria in tubes. The concentrated bacteria were resuspended to 0.1 the original volume with sterile unspent growth medium. Ten percent (10%) by weight of sterile glycerol was added to the resuspended bacterial concentrate.

4. The concentrate was quick-frozen and stored at −25° F (−31° C).

Culture concentrates of strains *Pediococcus cerevisiae* were prepared as disclosed in U.S. Pat. No. 3,561,977. Culture concentrates of *Lactobacillus plantarum* NRRL-B-5461 were prepared in the manner described in U.S. Pat. No. 3,814,817. Other lactic acid producing bacterial concentrates can be prepared in the same manner as is well known to those skilled in the art.

Frozen concentrates preferably include a freezing stabilizing agent, such as glycerol and other such compounds which are well known to those skilled in the art. Nutrient medium carried over with the bacteria during separation usually by centrifugation or supplementing those already present are preferably provided with the bacteria for rapid initial growth during fermentation in the meat. Freezing is usually less than −20° C and can be lowered to −196° C. The frozen concentrates preferably are provided in dosage units of between 50 and 500 grams to the sausage maker.

SAUSAGES

Curing and fermentation of the meat mixture in preparing sausage is accomplished as described in U.S. Pat. No. 3,814,817. If the meat mixture is to be pre-cured, the curing may follow established procedures and this involves keeping the preparation at a temperature of 36° to 38° F (2.2° to 3.3° C) for a short period of time (4 hours or less) to allow some of the edible nitrates to undergo bacterial reduction to nitrite which under acid conditions along with any added nitrite produces nitric oxide which effects the cure to produce the bright red sausage color. The curing step is unnecessary for producing sausage since *Micrococcus* NRRL-B-8048 rapidly produces the bright red color in the meat mixture during the fermentation.

The cured meat preparation mixed with the bacteria is stuffed in the casing which is traditionally associated with the particular type of dry or semi-dry sausage. The encased sausage may or may not be smoked depending on its particular type and the conventional practice.

If the specific product being made is a "dry" sausage, the sausages are hung in drying rooms in which fermentation takes place within the sausage. The rooms are kept at 50° to 80° F (10° to 26.6° C) temperature and high initial relative humidity above 80% and thereafter at 65–80% relative humidity, to assure that the sausage will dry from the inside outward.

If the specific product is a "semi-dry" sausage, the sausages would be moved into a smoke house or other suitable room or cabinet and are warmed, with or without an intermediate "tempering" period, to 80° to 125° F (26.6° to 52° C) internal temperature with high humidities, i.e., 75–95% relative humidity.

The fermentation period for dry sausage may be from 2 to 10 days with a drying period of up to four months to obtain the desired water activity of the sausage. The semi-dry sausage may be fermented for 6 to 36 hours depending upon the temperature used and the final pH desired. The semi-dry sausage after fermentation is normally heated in a smoke house or other suitable room to an internal temperature which destroys trichinae which may be present in the pork and to denature the meat proteins. Smoke may be applied during all, part or none of the fermentation period or subsequent to fermentation for the dry and semi-dry sausage, depending upon the nature of the specific sausage being produced.

*Micrococcus sp.* NRRL-B-8048, with or without the lactic acid producing bacteria, undergoes rapid growth or fermentation in the meat mixture. The increased rate of fermentation caused by the addition of the bacterial cultures develops the desired tang in sausage in a shorter period of time. The drying period can be materially shortened, by the use of this culture. *Micrococcus sp.* NRRL-B-8048 produces desirable flavors on a controlled basis which results in the unique flavor characteristic of dry sausage, particularly in combination with the lactic acid producing bacteria.

The final pH of sausage is between about pH 4.4 and 5.6. This pH may vary considerably depending upon the type of product produced and the requirements of the area where the sausage is to be consumed. The pH of the sausage can be controlled by using selected mixtures of the bacteria in various ratios.

The following are illustrative Examples of the present invention along with comparative Examples:

EXAMPLE 1, HARD SALAMI

Sausage meat mixture suitable for dry sausage was obtained from a commercial sausage operation. The formulation for 2,270 grams of chopped meat was:

60 gms — sodium chloride
6.8 gms — dextrose
6.8 gms — white pepper (ground)
1.14 gms — sodium erythorbate
0.23 gm — garlic powder
0.23 gm — cardamon
1.44 gms — sodium nitrate (45 ml of 3.2 gms sodium nitrate per 100 ml water) While maintaining meat mixture at less than 10° C, the above ingredients were thoroughly blended into mixture. The mixture was used for the following tests.

TEST 1 (COMPARATIVE)

Fifty-five ml of culture containing $1.1 \times 10^9$ cells of *Micrococcus roseus* (ATCC 186) per ml were thoroughly blended into above mixture. The mixture was immediately stuffed into a brown fibrous casing (Union Carbide 2 × 30 D.S.$_{t.m.}$) using a Vogt$_{t.m.}$ upright stuffer.

Exterior of casing was washed with a 2.5% solution of potassium sorbate. The sausage was hung in an incubator set at 21° C and 93% relative humidity for 48 hrs. The relative humidity was lowered to 90% for an additional 48 hours. Then temperature was lowered to 17° C and relative humidity was reduced to 86%. These conditions were maintained for 48 hours and then the relative humidity was reduced to 72% for the remaining drying period.

At the end of 28 days the sausage was evaluated for tang, color and flavor. The pH was determined by removing approximately 30 gms of meat from the casing and adding to 60 gms of distilled water. It was blended for 15 seconds at maximum speed. The pH was determined electrometrically.

The result was an unacceptable product with no flavor, poor color (gray) and no tang.

TEST 2 (COMPARATIVE)

The procedure of Test 1 was repeated with 55 ml of *Micrococcus varians* (ATCC 15306) culture containing $0.6 \times 10^9$ cells per ml.

The sausage that resulted had no flavor, poor color (gray), no tang and was unacceptable.

TEST 3 (COMPARATIVE)

The procedure of Test 1 was repeated with 55 ml of *Micrococcus sp.* NRRL-B-8049 culture containing 1.0 × 10$^9$ cells per ml. This is a commercially available *Micrococcus* used for making sausage. The sausage was a gray color initially which slowly became bright red after about 12 to 24 hours.

The sausage that resulted had a good flavor, characteristic of hard salami, but relatively little tang.

TEST 4

The procedure of Test 1 was repeated with 55 ml of *Micrococcus sp.* NRRL-B-8048 culture containing 1.4 × 10$^9$ cells per ml. The meat turned a uniform solid bright red color within 4 hours and stayed that way during the fermentation. The sausage that resulted had a good flavor, characteristic of hard salami, a slight tang and a bright red color.

Table II represents pH curves to the four test sausages plus the uninoculated control. The results indicate that *Micrococcus sp.* NRRL-B-8048 produced acid at a faster rate under the test conditions as compared to the known *Microccus* cultures: NRRL-B-8049; M. roseus ATCC 186 and *M. varians* ATCC 15306. The initial pH was 5.60.

TABLE II

|  | Control | *Micrococcus roseus* ATCC 186 | *Micrococcus varians* ATCC 15306 | *Micrococcus sp.* NRRL-B-8049 | *Micrococcus sp.* NRRL-B-8048 |
|---|---|---|---|---|---|
| pH Day 1 | 5.60 | 5.60 | 5.60 | 5.50 | 5.40 |
| pH Day 4 | 5.60 | 5.60 | 5.60 | 5.40 | 5.35 |
| pH Day 5 | 5.60 | 5.60 | 5.60 | 5.40 | 5.35 |
| pH Day 6 | 5.60 | 5.55 | 5.60 | 5.30 | 5.15 |
| pH Day 7 | 5.60 | 5.55 | 5.55 | 5.30 | 5.15 |
| pH Day 8 | 5.60 | 5.50 | 5.50 | 5.30 | 5.15 |

The final pH and taste of the sausage can be controlled by using a mixture of *Micrococcus sp.* NRRL-B-8048 in various ratios with bacteria that are good acid producers, such as *Lactobacillus plantarum* and *Pediococcus cerevisiae*. The following Example 2 is illustrative.

EXAMPLE 2, HARD SALAMI

Test 5

The procedure of test 1 was repeated with 55 ml of culture consisting of a mixture, in a ratio (by bacterial count) of 1 part *Micrococcus sp.* NRRL-B-8048 to 3 parts *Pediococcus cerevisiae* NRRL-B-5627. The bright red color developed in the fermenting meat in less than about 4 hours.

Test 6

The procedure of test 1 was repeated with 55 ml of culture consisting of a mixture in a ratio (by bacterial count) of 3 parts *Micrococcus sp.* NRRL-B-8048 to 1 part *Pediococcus cerevisiae* NRRL-B-5627. The bright red color developed in the fermenting meat in less than about 4 hours.

The sausages that resulted from tests 5 and 6 were evaluated organoleptically. Both sausages 5 and 6 had an excellent bright red color and a good flavor, characteristic of hard salami. Sausage 5 had more of a tange than sausage 6. The reason for this was that sausage 5 had a lower pH (4.75) than sausage 6 (pH 4.95) as can be seen from Table III. The initial pH was 5.70.

TABLE III

|  | Control | 3 parts *Micrococcus sp.*NRRL-B-8048 to 1 part *Pediococcus cerevisiae* NRRL-B-5627 | 1 part *Micrococcus sp.* NRRL-B-8048 to 3 parts *Pediococcus cerevisiae* NRRL-B-5627 |
|---|---|---|---|
| pH Day 1 | 5.70 | 5.30 | 5.40 |
| pH Day 2 | 5.70 | 5.15 | 5.20 |
| pH Day 3 | 5.60 | 5.00 | 4.90 |
| pH Day 5 | 5.50 | 4.95 | 4.75 |
| pH Day 6 | 5.50 | 4.95 | 4.75 |
| pH Day 7 | 5.50 | 4.95 | 4.75 |
| pH Day 8 | 5.50 | 4.95 | 4.75 |
| pH Day 9 | 5.50 | 4.95 | 4.75 |

The results shown in Table III indicate that the final pH of sausage can be controlled by regulating the ratio of acid producing bacteria such as *P. cerevisiae* NRRL-B-5627 and *Micrococcus sp.* NRRL-B-8048.

EXAMPLE 3, HARD SALAMI

Test 7

The procedure of test 1 was repated with 55 ml of culture consisting of a mixture, in a ratio (by bacterial count) of 1 part *Micrococcus sp.* NRRL-B-8048 to 3 parts *Lactobacillus plantarum* NRRL-B-5461. The bright red color developed in the fermenting meat in less than about 4 hours.

Test 8

The procedure of test 1 was repeated with 55 ml of culture consisting of a mixture in a ratio (by bacterial count) of 3 parts *Micrococcus sp.* NRRL-B-8048 to 1 part *Lactobacillus plantarum* NRRL-B-5461. The bright red color developed in the fermenting meat in less than about 4 hours.

The sausages that resulted from tests 7 and 8 were evaluated organoleptically. Both sausages 7 and 8 had a good flavor, characteristic of hard salami. Sausage 7 had more of a tang than sausage 8. The reason of this was that sausage 7 had a lower pH (pH 4.7) than sausage 8 (pH 4.9), as can be seen from Table IV. The initial pH was 5.70.

TABLE IV

|  | Control | 3 parts Micrococcus sp. NRRL-B-8048 to 1 part L. plantarum NRRL-B-5461 | 1 part Micrococcus sp. NRRL-B-8048 to 3 parts L. plantarum NRRL-B-5461 |
|---|---|---|---|
| pH Day 1 | 5.70 | 5.20 | 5.20 |
| pH Day 2 | 5.70 | 5.05 | 5.05 |
| pH Day 3 | 5.60 | 4.85 | 4.85 |
| pH Day 4 | 5.55 | 4.85 | 4.80 |
| pH Day 5 | 5.50 | 4.85 | 4.75 |
| pH Day 6 | 5.50 | 4.85 | 4.75 |
| pH Day 7 | 5.50 | 4.85 | 4.75 |
| pH Day 8 | 5.50 | 4.85 | 4.70 |
| pH Day 9 | 5.50 | 4.90 | 4.70 |

Tables III and IV show the pH for test sausages 5, 6, 7 and 8 plus the uninoculated control. The results indicate that the final pH of sausage can be controlled by regulating the ratio of acid producing bacteria such as L. plantarum NRRL-B-5461 or Pediococcus cerevisiae NRRL-B-5627 and Micrococcus sp. NRRL-B-8048. This enables the production of sausage with the proper pH for the taste requirements of the area where the sausage is to be consumed.

The rapid color change can also be achieved in making sausage at levels of less than about 75 ppm sodium nitrite alone and NRRL-B-8048. Usually at least about 50 ppm nitrite is needed to prevent the growth of botulism bacteria.

PROCESSED MEATS

Equivalent color results were achieved in processed meat formulations using nitrite alone at levels less than about 75 ppm and maintained at 10° to 40° C over a period of 4 hours or less. For instance, a red color was more rapidly developed in the meat at 50 ppm nitrite with NRRL-B-8048 than with the nitrite alone and the color was appealing. Also, mixture of 50 ppm nitrite and 156 ppm nitrite with NRRL-B-8048 also gave a particularly desirable color.

A qualitative test was performed to demonstrate the time of the reduction of nitrate to nitrite by NRRL-B-8048 and 8049 in the absence of meat. The test for nitrite was the classical method described in *The Ecology of Soil Bacteria* by Gordon, R. pages 293– 321 Liverpool Press (1967). One ml of a broth culture was withdrawn and mixed with 3 drops of solution A (sulfanilic acid, 0.8 gm; 5 N acetic acid, 100 ml) and 3 drops of solution B ($\alpha$-naphthylamine 0.5 gm; 5 N acetic acid, 100 ml). A positive test is the development or a red color within a few minutes. Negative tests for nitrite were confirmed by adding a minute amount of Zn dust; the development of a red color indicates the presence of unreduced nitrate.

The following two cultures were used: NRRL-B-8048, and NRRL-8049. The cultures were inoculated into 300 ml nitrate broth (beef extract, 3 gms; peptone, 5 gms; sodium nitrate, 1 gm per liter). The cultures were added at the rate of 5 ml of concentrate per 300 ml broth. Incubation was at 35° C. Samples were withdrawn and tested for nitrite at ½ hr. intervals.

The results are shown in Table V wherein + = positive for nitrite and += pink; ++ = red; and +++ = dark red.

TABLE V

| Time (hrs) | Culture 8049 | 8048 |
|---|---|---|
| 0.0 | – | – |
| 0.5 | – | ND* |
| 1.0 | – | + |
| 1.5 | – | ++ |
| 2.0 | – | +++ |
| 2.5 | – | ND |
| 3.5 | – | ND |
| 4.5 | – | ND |
| 5.0 | – | ND |
| 5.5 | – | ND |
| 6.0 | – | ND |
| 24.0 | +++ | ND |

*ND - Not Determined

Culture NRRL-8048 gave a much more rapid reduction of nitrate than NRRL-8049. Culture 8049 gave a positive nitrite test at 24 hours.

As can be seen from the foregoing description, Micrococcus sp. NRRL-B-8048 is a very useful bacterium for fermenting meat mixtures.

I claim:
1. The bacterial concentrate which comprises:
   a. Micrococcus sp. NRRL-B-8048; and
   b. between about 0.01 and 100 parts by bacterial count of a lactic acid producing bacterium which ferments in meat per part of the Micrococcus wherein the concentrate contains at least about 1 × $10^9$ bacteria cells per ml and sufficient nutrient medium for the bacterial cells to enhance growth during the fermentation and is frozen in the presence of a bacterial freezing stabilizing agent to less than about −20° C.
2. The composition of claim 1 which contains glycerol as the bacterial freezing stabilizing agent.
3. The composition of claim 1 in dosage units of between about 50 and 500 grams.
4. The concentrate of claim 1 wherein the lactic acid producing bacterium is Lactobacillus plantarum.
5. The composition of claim 4 wherein the strain of Lactobacillus plantarum is NRRL-B-5461.
6. The concentrate of claim 1 wherein the lactic acid producing bacterium if Pediococcus cerevisiae.
7. The composition of claim 6 wherein the strain of Pediococcus cerevisiae is NRRL-B-5627.
8. In the process for producing of dry and semi-dry sausage and other meat products by fermentation with bacteria to lower the pH and to develop flavor the improvement which comprises:
   fermenting with meat without acid generating and regulating chemicals in the presence of an edible nitrate or an edible nitrite or mixtures thereof a composition which comprises as the active ingredients Micrococcus sp. NRRL-B-8048 and at least one lactic acid producing bacterium which ferments in meat so as to produce a uniform solid bright red color, wherein added nitrite is used in an amount between about 50 and less than 75 parts per million of meat which rapidly produces a color change in the presence of NRRL-B-8048 and wherein the fermented pH is between about 4.4 and 5.6.

9. The process of claim 8 wherein the fermentation is at an internal meat temperature of 10° C about 52° C and at a pH starting at about 6.8 and going down to above about 4.4.

10. The process of claim 8 wherein the lactic acid producing bacterium is *Lactobacillus plantarum*.

11. The process of claim 10 wherein the *Lactobacillus plantarum* is NRRL-B-5461.

12. The process of claim 8 wherein the lactic acid producing bacterium is *Pediococcus cerevisiae*.

13. The process of claim 8 wherein the lactic acid producing bacterium is *Pediococcus cerevisiae* NRRL-B-5627.

14. The process of claim 8 wherein the bacteria are provided in the form of a composition containing at least about $1 \times 10^8$ cells per milliliter.

15. The process of claim 8 wherein the bacteria are in the form of a frozen concentrate contaning at least about $1 \times 10^9$ cells per milliliter which is thawed for use and wherein 0.0001 to 0.01 part by weight by concentrate per part by weight of meat is used.

16. The bacterial concentrate which comprises at least about $1 \times 10^9$ cells per ml of *Micrococcus sp.* NRRL-B-8048 in a nutrient medium which permits growth of the bacterial cells in meat fermentation processes and with a freezing stabilizing agent, the concentrate being frozen.

17. The bacterial concentrate of claim 16 which contains glycerol as the freezing stabilizing agent and is frozen to less than about −20° C.

18. In the process for producing a red color in meat by acidic conversion of an edible nitrite to nitric oxide which reacts with pigments in the meat and by the conversion of an edible nitrate to nitrite by bacteria the improvement which comprises mixing with meat without acid generating and regulating chemicals in the presence of an edible nitrate or an edible nitrite or mixtures thereof a composition which comprises as an active ingredient *Micrococcus sp.* NRRL-B-8048 so as to produce a uniform solid bright red color, wherein added nitrite is used in an amount between 50 to 75 parts per million of meat which rapidly produces a color change in the presence of NRRL-B-8048.

19. The process of claim 18 wherein the meat is maintained at a temperature between 10° and 40° C for less than about 4 hours and then is processed at elevated temperatures which kills the NRRL-B-8048.

* * * * *

UNITED STATES PATENT AND TRADEMARK OFFICE
CERTIFICATE OF CORRECTION

PATENT NO. : 4,013,797
DATED : 1977 March 22
INVENTOR(S) : Alfred J. Gryczka

It is certified that error appears in the above-identified patent and that said Letters Patent are hereby corrected as shown below:

Column 2, line 53, after "edible" insert --nitrite--.

Column 3, line 19, delete "aobut" and insert --about--.

Column 5, line 30, delete "and" (second occurence).

Column 5, line 31, delete 1.0%.

Column 5, line 39, before "6" insert --six--.

Column 9, line 33, delete "to" and insert --of--.

Column 10, line 12, delete "tange" and insert --tang--.

Column 10, line 65, "of", second occurrence, to read -- for --.

Column 11, line 38, delete "nitrite" and insert --nitrate--.

Column 11, line 49, delete "or" and insert --of--.

Column 12, line 57 (Claim 6), delete "if" and insert --is--.

Column 13, line 11 (Claim 9) after "10°C" insert --to--.

Column 13, line 28 (Claim 15) delete "contaning" and insert --containing--.

UNITED STATES PATENT OFFICE
CERTIFICATE OF CORRECTION

Patent No. 4,013,797　　　　　　　　Dated　March 22, 1977

Inventor(s)　Alfred J. Gryczka

It is certified that error appears in the above-identified patent and that said Letters Patent are hereby corrected as shown below:

Column 14, line 1, (Claim 15) after "weight" delete "by", second occurrence, and insert -- of --.

Signed and Sealed this twelfth Day of July 1977

[SEAL]

Attest:

RUTH C. MASON
*Attesting Officer*

C. MARSHALL DANN
*Commissioner of Patents and Trademarks*